3,431,253
FRUCTOSE FORMATION FROM GLUCOSE

Frederick W. Parrish, Natick, Mass., assignor to the United States of America as represented by the Secretary of the Army
No Drawing. Filed Sept. 6, 1966, Ser. No. 577,532
U.S. Cl. 260—209   8 Claims
Int. Cl. C07c *29/00;* C13k *9/00*

ABSTRACT OF THE DISCLOSURE

A process for conversion of glucose to fructose which comprises reacting a glucose solution with finely divided alumina having a pH in the range of 7.0 to 11.0 at a temperature from 35° to 70° C.

---

This invention relates to a process for the production of fructose and more particularly to a process for the isomerization of glucose by the action thereon of alumina to form fructose.

The economic desirability of a practical process for the conversion of glucose to fructose is readily apparent when one considers the large quantities of glucose which are obtained at low cost by the hydrolytic conversion of corn starch to corn syrups. Corn syrups consist of glucose together with the disaccharide maltose and higher dextrins. The amount of glucose present depends on the degree of hydrolysis to which the starch is subjected. While corn syrups or glucose are capable of direct use as such in many food applications, because of the lower sweetness values of glucose or the corn syrups as compared to sucrose, the former cannot be used as a substitute for the latter where the greater level of sweetness is required. Fructose, an isomer of glucose, has a sweetness value that is equal to or greater than that of sucrose. If then some of the glucose in corn syrups could be converted to fructose by a practical process, then the converted corn syrups would be suitable substitutes for sucrose in food processing. Corn syrups would also constitute an important alternative or back up supply for sucrose-based sweeteners in event of failure or loss of a sugar cane crop.

The isomerization of glucose to fructose by the action of aqueous alkali has long been known and was first reported by Lobry de Bruyn and Alberda van Ekenstein in 1895 (Rec. trav. chim. 14, 203). Since that time, various alkali and other highly basic materials have been employed to bring about the isomerization and, more recently, it has been discovered that certain ion exchange resins are also effective for this purpose. None of the prior art methods, however, are suitable for commercial or large scale conversion of glucose to fructose because of the low yield rates, the loss or destruction of sugar and the formation of undesirable by-products which can only be removed with great difficulty and at great cost. For example, the use of strong bases to effect the isomerization causes a considerable portion of the glucose to be converted to organic acids which have no sweetness value and which may impart undesirable flavors to the product and, in addition, there are formed ketose sugars other than fructose which have little or no value, together with dark coloring substances which affect the color and appearance of the product. Ion exchange resins are subject to the same deficiencies and, in addition, are expensive and while not consumed in the process require expensive regeneration and suffer a certain loss by attrition in use.

The present invention is based upon the discovery that alumina will effect a conversion of glucose to fructose with yields as high as 45%. Of even greater significance than the high yield rate from the standpoint of developing a practical process, is the fact that the conversion can be accomplished without the loss of sugar or the formation of unwanted by-products. In addition, the alumina is not consumed or used up in the process and being insoluble in the solution of the reactants, is easily removed by filtration.

Alumina is commercially available as acid, neutral or basic alumina. Alumina may, however, be prepared so as to have a pH in the range of from 4.0 to about 11.0 by the acidification of the raw alumina. For purposes of this invention only alumina having a pH in the range of 7.0 to about 11.0 is used since alumina having a more acid pH has an extremely low conversion rate. While reagent grade alumina is used in the examples described herein, other less pure forms of alumina may be employed provided all water soluble impurities are removed. While the particle size of the alumina is not critical to this invention, the conversion is thought to be attributable to a reaction taking place on the surface of the alumina. Consequently, the more finely divided the alumina, the greater the total surface area of the alumina and the more efficient the conversion.

Glucose may be employed in the pure state or mixed with other sugars. Corn syrups as indicated above, are a convenient and inexpensive source of glucose and can be converted to a product containing varying amounts of fructose by treating with alumina as described herein.

The isomerization of glucose to fructose is accomplished in accordance with the present invention by bringing a solution of glucose together with alumina and holding until the conversion is completed. The glucose may be in aqueous solution or in mixed aqueous-lower alcohol solutions, such as, 90% methanol, 80% ethanol and 75% propanol solutions. The reaction proceeds readily from about 35° C. to about 70° C. and the preferred range is from 40 to 60° C. The reaction time will vary with temperature with the reaction proceeding more quickly at the higher end of the temperature range. Above 70° C., however, there occurs a loss of sugar and concomitant formation of organic acids. Below 35° C., the conversion rate is too slow to be of practical value.

When the conversion is completed, the alumina is readily removed by filtration. The resulting solution consisting of a mixture of fructose and glucose may be employed as such, or the fructose can be removed by techniques well known in the art. It is noted that complete conversion of glucose to fructose is not effected since an equilibrium appears to exist between the two isomers.

The following examples are given by way of illustration to more clearly disclose the nature of the present invention and set forth the best mode of performing the same known to the inventor. It should be understood, however, that the examples are not intended to be a limitation on the scope of the invention.

Example 1

250 grams of basic alumina granules, (Woelm, pH 10.6) 40 to 200 mesh, are inserted in a glass column and washed with 4 liters of distilled water to remove any water soluble impurities that might be present. The washed alumina is heated to 120° C. for 16 hours. A slurry consisting of 9.2 grams of D-glucose (reagent grade) and 100 grams of the washed alumina in 70 ml. water is then placed in a glass vessel and held for 60 hours at 50° C. The alumina is mechanically filtered from the solution and the solution is passed through an ion exchange resin to separate the fructose and glucose fractions. The separation technique is that described by S. Adachi and H. Sugawara in the Arch. Biochem. Biophysics 100, 468–471 (1963) wherein the sugar mixture in an n-propanol solution is passed through a column containing a strong base anion exchange resin in bisulfite form. The fructose is eluted from the column by washing with an n-propanol solution and the glucose eluted with water. The amount of fructose recovered is 3.6 grams which is a 40% conversion.

Fructose was identified as the 2,3:4,5-di-O-isopropyl-idene derivative prepared by the procedure of D. J. Bell described in J. Chem. Soc. 1461–1464 (1947).

Example 2

20 grams of basic alumina (Woelm, pH 10.6) are washed with one liter of methanol to remove methanol soluble impurities followed by heating at 120° C. for 16 hours. The methanol washed alumina is combined with 1.2 grams of D-glucose (reagent grade) in 15 ml. water in a glass vessel and held for 60 hours at 50° C. After removal of the alumina, the D-fructose is separated as in the preceding example and found to yield 528 mg. of D-fructose and 642 mg. of D-glucose. The conversion to D-fructose was 45%.

Example 3

2 grams of D-glucose (reagent grade) are slurried in 35 ml. water with 50 grams of basic alumina. The slurry is held at 50° C. for 44 hours. After cooling to room temperature, the alumina is removed by filtration and the D-fructose separated from the solution by the technique referred to in Example 1. The yield of D-fructose is 722 mg. and the D-glucose recovered is 1.24 g. The conversion to fructose is 36%.

Example 4

100 grams of basic alumina, (Fisher 591, anhydrous aluminum oxide having a pH of 10.5 and containing less than 0.01% of alkali and alkaline earth metals) are slurried with 5 grams of D-glucose (reagent grade) in 70 ml. water in a glass vessel. The temperature within the vessel is maintained at 35° C. and the reaction allowed to proceed for 48 hours. The D-fructose is separated from the solution as disclosed in Example 1 and the yield was found to be 0.6 g. or a 12% conversion.

Example 5

5 grams of D-glucose are reacted with alumina as in Example 4 except that a neutral alumina (Woelm, pH 7.4) is utilized and the temperature is maintained at 70° C. There is obtained 1.3 gms. of fructose or a 26% conversion. 3.7 gms. of glucose are recovered indicating that no sugar was lost during the process.

I claim:
1. A method of preparing D-fructose by the isomerization of D-glucose which comprises subjecting D-glucose to the action of finely divided alumina.
2. The method of claim 1 wherein the isomerization is effected at a temperature of from 35 to 70° C.
3. The method of claim 1 wherein the alumina has a pH in the range of from 7.0 to 11.0.
4. The method of claim 3 wherein the isomerization is effected at a temperature of from 35 to 70° C.
5. The method of claim 2 wherein the D-glucose which is isomerized to D-fructose is in aqueous solution.
6. The method of claim 5 wherein the alumina has a pH in the range of from 7.0 to 11.0.
7. The method of claim 6 wherein the isomerization is effected at a temperature within the range of from 40 to 60° C.
8. The method of claim 7 wherein the D-glucose is present as corn syrup.

References Cited

UNITED STATES PATENTS 3,256,270   6/1966   Haack et al. _____ 260—209

LEWIS GOTTS, Primary Examiner.

JOHNNIE R. BROWN, Assistant Examiner.